United States Patent
Schnellbach

(10) Patent No.: US 10,703,284 B2
(45) Date of Patent: Jul. 7, 2020

(54) EXTERIOR REARVIEW MIRROR WITH CONSTANT GROUND ILLUMINATION

(71) Applicant: Magna Mirrors Holding GmbH, Sailauf (DE)

(72) Inventor: Felix Schnellbach, Freudenberg (DE)

(73) Assignee: MAGNA MIRRORS HOLDING GMBH, Sailauf (DE)

( * ) Notice: Subject to any disclaimer, the term of this patent is extended or adjusted under 35 U.S.C. 154(b) by 0 days.

(21) Appl. No.: 16/296,287

(22) Filed: Mar. 8, 2019

(65) Prior Publication Data
US 2019/0275948 A1  Sep. 12, 2019

Related U.S. Application Data

(60) Provisional application No. 62/640,053, filed on Mar. 8, 2018.

(51) Int. Cl.
*B60R 1/12* (2006.01)
*B60R 1/072* (2006.01)
*B60R 1/074* (2006.01)

(52) U.S. Cl.
CPC ............ *B60R 1/1207* (2013.01); *B60R 1/072* (2013.01); *B60R 1/074* (2013.01); *B60R 2001/1215* (2013.01)

(58) Field of Classification Search
None
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,497,306 A | 3/1996 | Pastrick |
| 5,669,699 A | 9/1997 | Pastrick et al. |
| 5,823,654 A | 10/1998 | Pastrick et al. |
| 6,176,602 B1 | 1/2001 | Pastrick et al. |
| 6,227,689 B1 | 5/2001 | Miller |
| 6,276,821 B1 | 8/2001 | Pastrick et al. |
| 6,349,450 B1 | 2/2002 | Koops et al. |
| 6,550,103 B2 | 4/2003 | Koops et al. |
| 6,582,109 B2 | 6/2003 | Miller |
| 6,690,268 B2 | 2/2004 | Schofield et al. |
| 7,195,381 B2 | 3/2007 | Lynam et al. |
| 7,581,859 B2 | 9/2009 | Lynam |
| 7,626,749 B2 | 12/2009 | Baur et al. |

(Continued)

*Primary Examiner* — Thomas M Sember
(74) *Attorney, Agent, or Firm* — Honigman LLP

(57) ABSTRACT

An exterior rearview mirror assembly includes a mirror head pivotally mounted at a mounting base. The mirror head includes a mirror casing and a reflective element adjustably disposed at the mirror casing. An illumination device is disposed at the mirror head. The illumination device includes a light source that, when operated with the mounting base attached at the side of a vehicle, emits visible light to illuminate a ground region at the side of the vehicle. A powerfold actuator is electrically operated to pivot the mirror head relative to the mounting base between a folded position and a drive position. When the powerfold actuator pivots the mirror head, and with the light source of the illumination device operated, the visible light emitted by the light source is directed toward the same ground area at the side of the vehicle throughout the range of pivotal movement of the mirror head.

19 Claims, 7 Drawing Sheets

(56) References Cited

U.S. PATENT DOCUMENTS

| | | |
|---|---|---|
| 8,333,492 B2 | 12/2012 | Dingman et al. |
| 8,801,245 B2 | 8/2014 | De Wind et al. |
| 2012/0069591 A1* | 3/2012 | Pastrick ............... B60Q 1/2665 362/494 |
| 2015/0224919 A1 | 8/2015 | Sobecki et al. |
| 2019/0106051 A1 | 4/2019 | Huizen et al. |
| 2019/0270403 A1 | 9/2019 | Sobecki et al. |

* cited by examiner

EXTERIOR REARVIEW MIRROR WITH CONSTANT GROUND ILLUMINATION

CROSS REFERENCE TO RELATED APPLICATION

The present application claims the filing benefits of U.S. provisional application Ser. No. 62/640,053, filed Mar. 8, 2018, which is hereby incorporated herein by reference in its entirety.

FIELD OF THE INVENTION

The present invention relates generally to the field of exterior rearview mirror assemblies for vehicles and, more particularly, to the field of electrically foldable or powerfold exterior rearview mirror assemblies with a ground illumination light or security light.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position. It is customary to integrate lighting units for a plurality of functions into the exterior rearview mirror assembly. Such a lighting function is, for example, for illuminating the ground on the side of a car so as to make visible obstacles to a person who is approaching the car (a near field lamp or surroundings or ground illumination lamp). A further lighting function is to illuminate a region when parking (a parking or maneuvering lamp).

These lighting units are typically located on the underside of an exterior rearview mirror assembly and/or are arranged integrated in the housing of the exterior rearview mirror assembly, wherein the lens of the lighting unit preferably terminates flush with the surface of the housing of the exterior rearview mirror assembly.

Furthermore, in the context of a powerfold or electrically foldable mirror assembly, the mirror head which is mounted on the mirror baseplate by means of an axle can be pivoted between a driving position and a position of use and a folded-in position or parking position by means of an actuator. In the case of integration of a surroundings lamp, when the exterior rearview mirror assembly pivots from the position of use into the parking position, the illuminated region on the ground next to the vehicle also correspondingly migrates along in accordance with the position of the mirror head. This pivoting takes place in a pivoting range between the position of use and the parking position in which the mirror head is folded rearward against the vehicle in the direction of travel.

SUMMARY OF THE INVENTION

The present invention provides an exterior rearview mirror assembly with an integrated surroundings lamp which can be folded in and during the folding in illuminates a defined constant region on the ground next to the vehicle in every position of the mirror head between the position of use and the parking position. The exterior rearview mirror assembly is mounted at a side of an equipped vehicle that includes an electrically operable powerfold actuator system to pivot the mirror head of the mirror assembly between a drive or use position and a folded or park position responsive to a user input. The mirror assembly includes a ground illumination light or illumination device that emits visible light to illuminate a ground region or area at the side of the vehicle at which the mirror assembly is mounted. The mirror assembly is configured to adjust the aim of the lighting element responsive to adjustment or pivoting of the mirror head relative to the side of the vehicle so that the illumination encompasses the same or substantially same ground area or region throughout the range of pivotal movement of the mirror head between the use position and the folded position. The lighting adjustment mechanism may comprise a connecting element or cable that connects to a pivotable or movable portion of the lighting device (that includes the light source or LED), so that, when the mirror head pivots, the movable portion of the lighting device pivots relative to the pivoting mirror head to maintain the principal axis of the light emitting by the lighting device toward the same or generally the same ground area or region. The exterior rearview mirror assembly thus is configured to the effect that the illumination is set by the surroundings lamp in such a way that the illumination comprises the same or substantially the same ground area over the entire extent of the pivoting movement of the mirror head between the position of use and the parking position.

The surroundings lamp can be embodied in such a way that information such as a symbol, a figure or a logo, is projected in the region of the illumination region. The illumination device and mirror assembly are configured such that the projected symbol or logo at the ground is not rotated as the mirror head pivots between the use or drive position and the park or folded position. In other words, the logo maintains its orientation (and general location) at the ground relative to the side of the vehicle throughout the range of pivotal movement of the mirror head.

The exterior rearview mirror assembly may comprise a connecting element or cables and a resetting element which establishes a coupling between the mirror baseplate and a movable part of the lighting unit. As a result, when the mirror head pivots, the movable part of the lighting unit, which part comprises the lighting means, moves with respect to the pivoting mirror head in such a way that the main axis of the light emitted by the lighting unit remains directed onto the same or essentially the same ground area, with the result that the same constant ground area is illuminated.

In one development of the inventive concept, the adjustment of the movable part can also take place by means of a motor and an assigned gear mechanism unit, wherein the movable part of the lighting unit is adjusted as a function of the pivoting angle of the mirror head in such a way that the main axis of the light emitted by the lighting unit remains directed onto the same ground area in order to illuminate an identical ground area.

In an alternative embodiment there is provision that lighting elements, preferably light emitting diodes (LEDs) are arranged at different positions on the underside of the exterior rearview mirror assembly in such a way that each lighting element is activated in an assigned pivoting angle/pivoting range, and in each case the same constant ground area is illuminated in this pivoted position. Alternatively, a correspondingly actuated light strip can also be arranged.

In yet another embodiment, a plurality of lighting elements, preferably LEDs, may be arranged at a location in the region of the underside of the exterior rearview mirror assembly, wherein a collimator element is arranged in the radiation range of the light of the LEDs and embodied in such a way that each lighting element is activated at an assigned pivoting angle/in an assigned pivoting range, and in each case the same constant ground area is illuminated in this pivoted position.

These and other objects, advantages, purposes and features of the present invention will become apparent upon review of the following specification in conjunction with the drawings.

DESCRIPTION OF THE PREFERRED EMBODIMENTS

The following description relates to integration of a lighting unit, preferably of a surroundings lamp, in an exterior rearview mirror assembly of a motor vehicle. According to the illustration of the figures, in this context the Z direction denotes the vertical axis, the Y direction denotes the transverse axis and the X direction denotes the longitudinal axis of the vehicle.

Figure 1A:
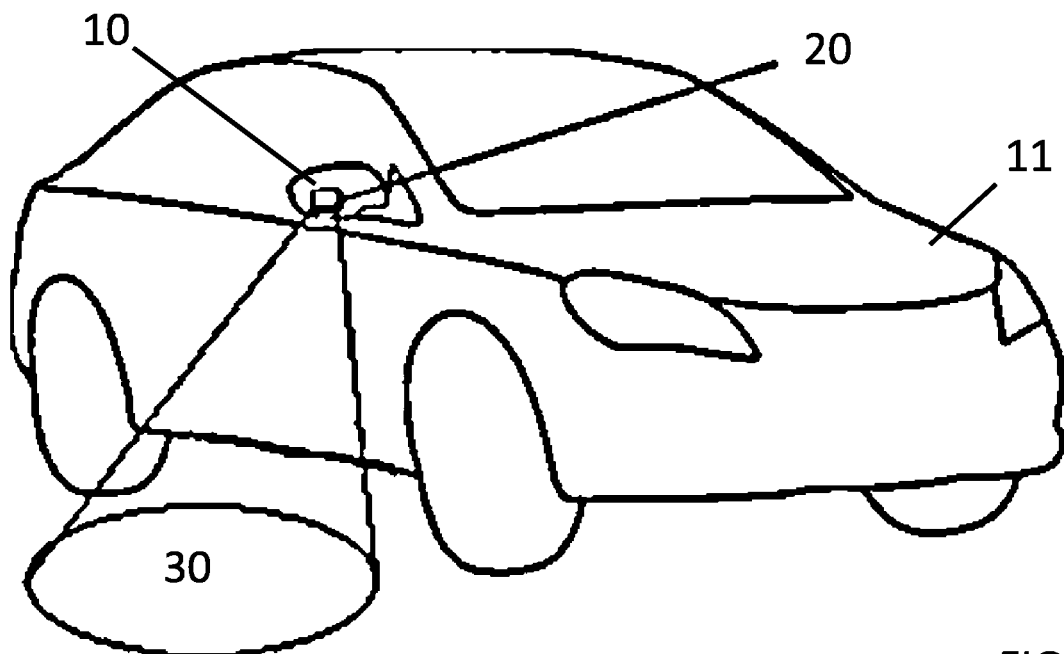
FIG. 1A is a perspective view of a vehicle with an illumination device at an exterior rearview mirror assembly.
Figure 1B:
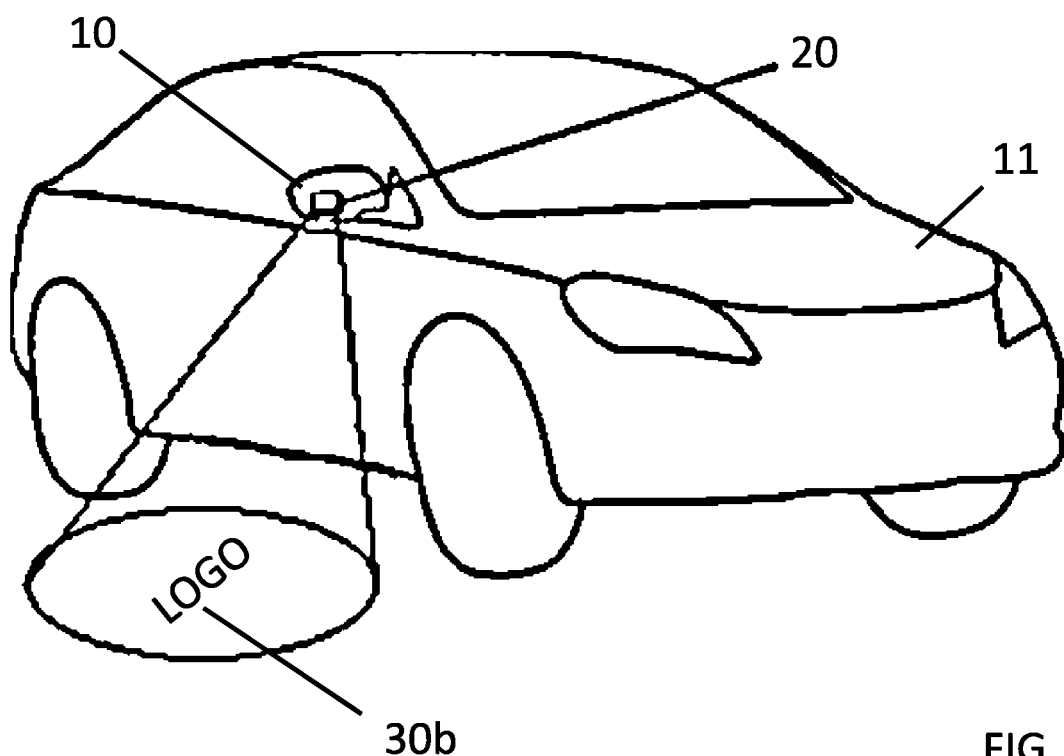
FIG. 1B is a perspective view of a vehicle having an alternative embodiment of a surroundings lamp with a projection of a logo on an exterior rearview mirror assembly.
Figure 2:
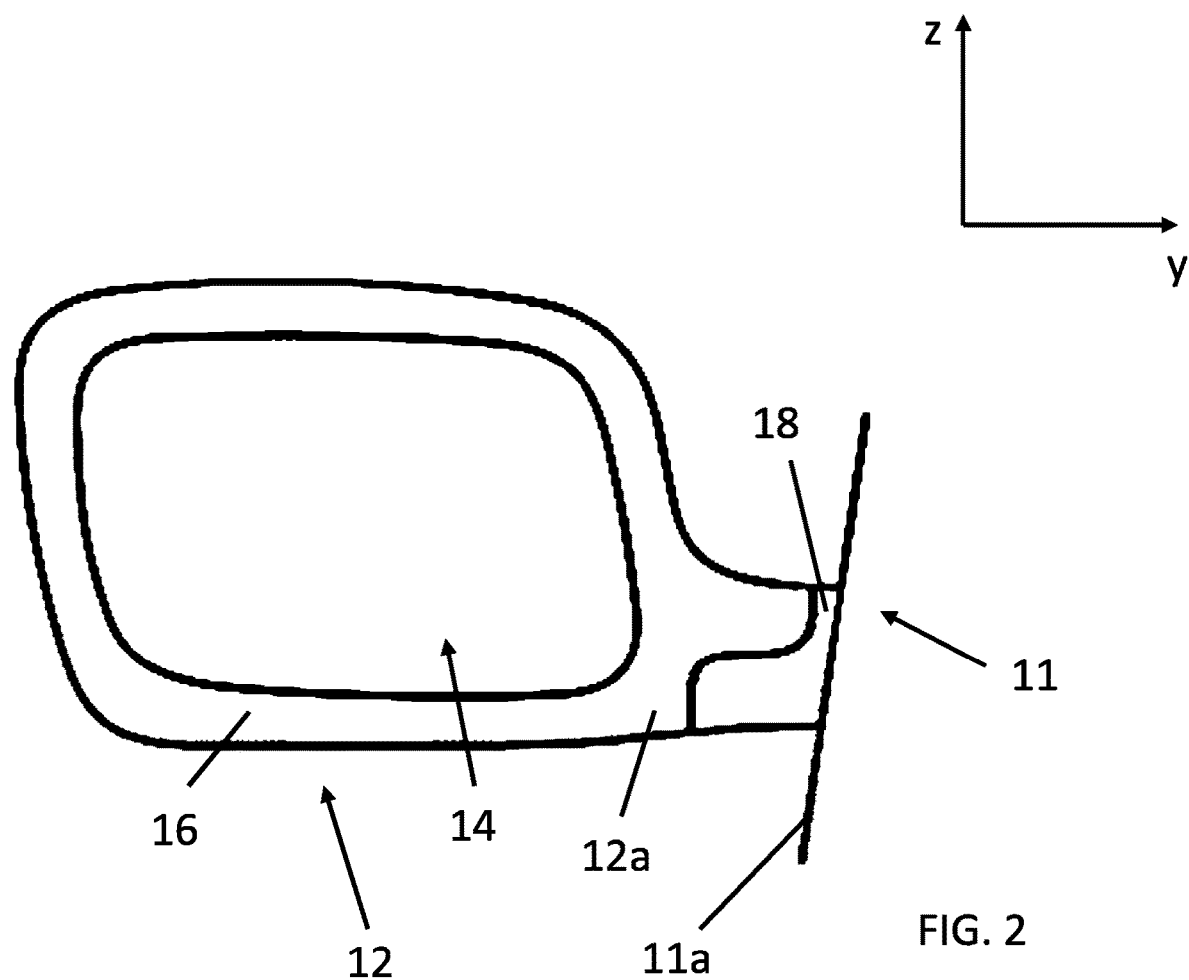
FIG. 2 is a perspective view of the exterior rearview mirror assembly.
Figure 3:
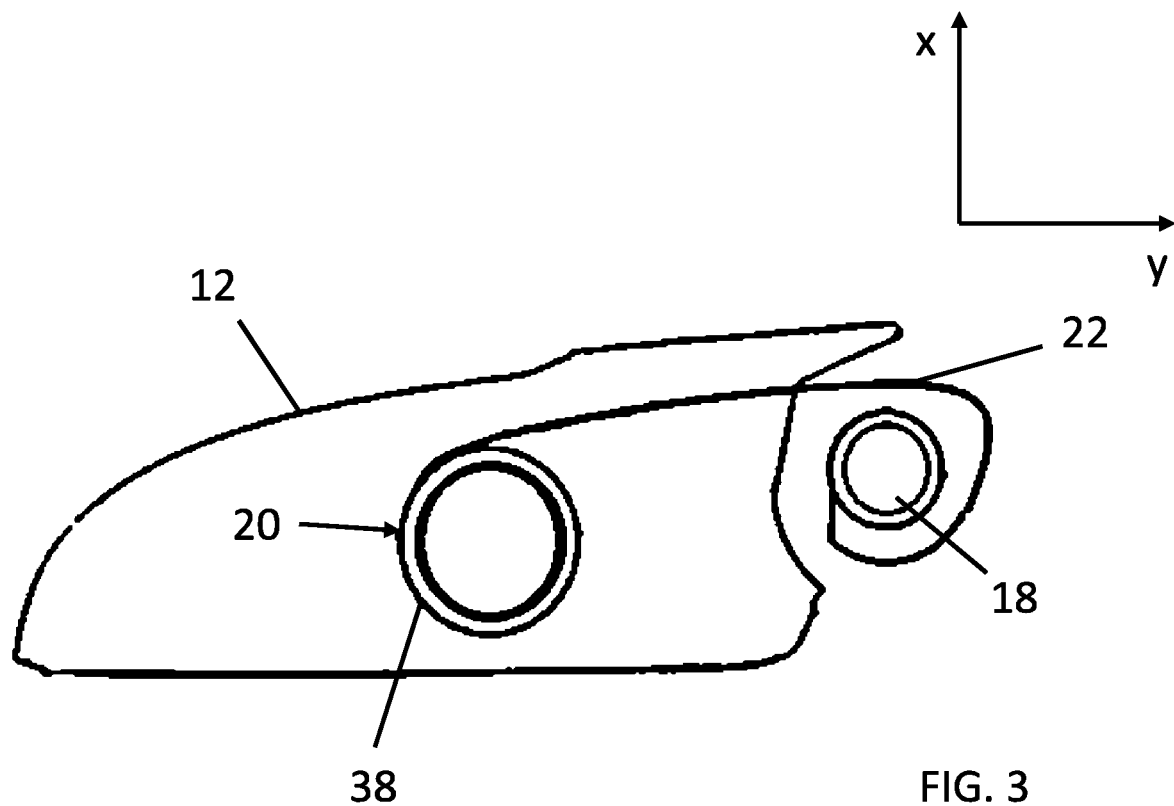
FIG. 3 is a sectional view of the exterior mirror assembly, with the mirror head pivoted to an extended or use position.

Referring now to the drawings and the illustrative embodiments depicted therein, an exterior rearview mirror assembly 10 for a vehicle 11 includes a mirror head 12 that includes a mirror reflective element 14 received in and/or supported at or by a mirror shell or casing 16 of the mirror head portion 12 (FIGS. 1A, 1B and 2). The mirror head portion 12 includes a lower housing or mounting portion 12a that is pivotally or movably mounted to a mounting arm or base or portion 18. The mirror assembly 10 comprises a powerfold mirror (where the mirror head portion may be pivoted via an actuator assembly or adjustment device), and may comprise a breakaway mirror (where the mirror head portion may be manually pivoted about the mounting arm or base). The mounting arm or base 18 of mirror assembly 10 is mounted at the side 11a of a host or subject vehicle 11, with the reflective element 14 providing a rearward field of view along the respective side of the vehicle to the driver of the vehicle. The mirror assembly includes an illumination device that, when operated, illuminates the ground at the side of the vehicle at which the mirror assembly is attached.

The illumination device 20 includes a base portion or outer portion 20a and a movable portion or inner portion or inner housing 20b that moves relative to the outer portion 20a (which is fixedly disposed at the mirror casing) so that the illumination device illuminates generally the same ground region or area irrespective of positioning of the mirror casing or mirror head relative to the mounting portion and the side of the vehicle, as discussed below. In other words, the illumination device is adjusted so that its orientation is such that light emitted by the illumination device is directed toward the same location at the ground at the side of the vehicle (such as by directing a principal axis of the illumination field toward the same general area at the ground at the side of the vehicle) as the mirror head is adjusted.

An exterior rearview mirror assembly 10, which is shown in FIG. 2, comprises a mirror baseplate 18, a reinforcing plate as part of a mirror head 12 and an articulated connection, formed between the mirror baseplate 18 and mirror head 12, for pivotally adjusting the mirror head 12 on the mirror baseplate 18 about a pivoting axis A. The mirror baseplate 18 serves here to connect the exterior rearview mirror assembly 10 to the vehicle bodywork on the outer driver's side or outer front seat passenger's side of the motor vehicle 11. The reinforcing plate is surrounded in the mounted state of the exterior rearview mirror assembly 10 by a housing half shell of a mirror housing 16 of the mirror head 12 and holds the glass assembly or the mirror glass, also referred to as the mirror reflective element 14.

Figure 4:
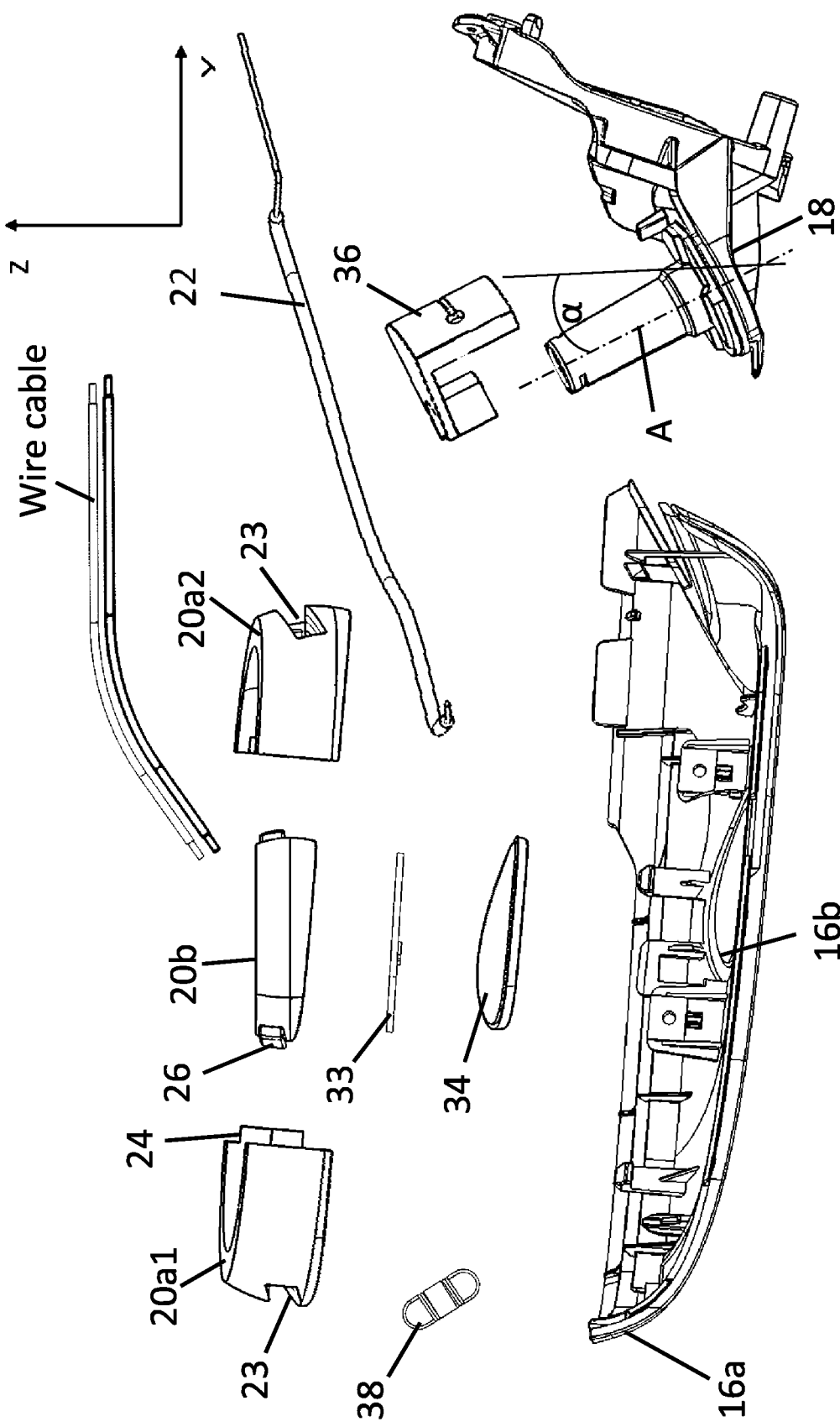
FIG. 4 is an exploded perspective view of the exterior mirror assembly.

The exterior rearview mirror assembly 10 comprises electrically foldable or powerfold construction, wherein the mirror head 12 can be pivoted about the pivoting axis A (FIG. 4) by means of an electrically activatable actuator arrangement, also referred to as folding-in drive or powerfold actuator. The mirror head 12 can also be pivoted manually either into the position of use or into the parking position. The mirror head 12 can also optionally be pivoted into a folded-in position, which extends in the direction of travel of the vehicle. The folded-in position is a position which is set after an impact. The pivoting axis A of the mirror head 12 with respect to the mirror baseplate 18 can be an axis which runs in the Z direction or a pivoting axis A which (as shown in FIG. 4) is inclined by an angle alpha with respect to the Z axis.

The mirror baseplate 18 of the exterior rearview mirror assembly 10 is attached to the side 11a of the vehicle 11, wherein the reflective element 14 makes available a field of vision to the rear for the driver of the vehicle, along the respective side of the vehicle. The exterior rearview mirror assembly 10 contains a surroundings or ground illumination lamp 20. As is apparent from the schematic illustrations of the drawings, the surroundings lamp 20 is arranged integrated at the side of the mirror housing 16 which is directed downwards to the ground, in a receptacle opening 16a in a housing half shell 16a of the mirror housing 16.

When the surroundings lamp 20 is actuated, it illuminates the ground at the side of the vehicle 11 at which the exterior rearview mirror assembly 10 is mounted, in an illumination region 30 (FIG. 1A). As is apparent from FIG. 1B, in an alternative embodiment the surroundings lamp 20 can be embodied in such a way that information 30b, such as, for example, a pattern, an image or a logo or the like, is projected into the illumination region 30.

The surroundings lamp 20 includes a base part 20a which is fixedly mounted on the mirror head and is accommodated in the housing half shell 16a, and a part 20b which can move with respect to the base part 20a. The movable bearing of the part 20b is embodied in such a way that the surroundings lamp 20 illuminates the same ground region 30 virtually without change, irrespective of the positioning of the mirror head 12 with respect to the mirror baseplate 18 and the side 11 of the vehicle when a pivoting movement from the position of use into the parking position occurs. For applications that include a logo or symbol or icon, the adjustment of the movable part 20b allows for the projected logo or symbol or icon to be at the ground and not rotating (i.e., maintaining its orientation relative to the side of the vehicle) while the mirror head pivots between the use position and the parking or folded position.

The base part 20a of the surroundings lamp 20 is attached at a lower part of the mirror housing 12 (FIG. 4), wherein the light/light beams irradiated by the surroundings lamp 20 illuminates/illuminate through an opening 16b formed at the lower part of the mirror housing 16.

In general, the surroundings lamp 20 and therefore also the base part 20a are attached at the base of a single-piece mirror housing, or in the case of a two-piece or multi-piece mirror housing 16, the surroundings lamp 20 and the base part 20a are accommodated at the lower housing half shell 16a.

In the illustrated embodiment, the base part 20a comprises two half-shell-shaped components 20a1 and 20a2 (FIG. 4). In order to simplify the assembly, one of the base parts 20a1 or 20a2 has at least one projection 24 which engages in the corresponding receptacles 25 of the second base part, base parts 20a1 or 20a2. The two half shells can therefore be readily positioned around the inner part 20b and can be joined or connected to form a ring.

The two half shells of the base parts 20a1 or 20a2 each includes a slot 23. As is apparent from the drawings, in the assembled state of the base part 20a the slots 23 are arranged opposite and offset with respect to one another by 180°.

The inner part 20b has at its outer side guide elements 26, which are arranged opposite one another and which are mounted in the assigned slots 23. The slots 23 constitute guides for the guide elements 26, which are embodied as pins, with the result that the inner part 20b can move with respect to the base part 20a along the slots 23. The slots 23 in the base part 20a have an arcuate design and do not extend parallel to the upper edge 27 of the base part 20a.

In further exemplary embodiments, the movable bearing of the part 20b on the base part 20a can also be embodied in a structurally different way. The inner part 20b is positively supported on the base part 20a in such a way that the orientation of the inner part 20b with respect to the ground area remains the same during the adjustment movement from the position of use into the parking position, with the result that virtually or substantially or generally the same ground region 30 is illuminated during the entire adjustment movement.

The inner part 20b comprises a circuit board 33 with associated circuit arrangement and/or electrical wiring and a light source, for example, one or more light-emitting diodes (LEDs) which are protected by a cover 34. These components can be pre-mounted in a compact fashion in the inner part 20b. The inner movable part 20b is embodied in an annular shape.

The inner movable part 20b is connected in a positionally fixed fashion to an element 36 on the mirror baseplate 18 by means of a connecting element 22 such as, for example, a Bowden cable, a wire or a cable or the like. As can be seen from the exploded illustration in FIG. 4, the element 36 is arranged in or fixedly disposed at the region of the bearing axis A of the mirror baseplate 18.

For example, the element 36 may be disposed at or near the axis A and fixed relative to the mounting base or baseplate 18. Thus, as the mirror head pivots, the connecting element 22 may wind around the element 36 and pull at the movable part of the illumination device, which causes the guide element 26 to move along the arcuate slot 23 to adjust the orientation of the movable part and the light source relative to the mirror head, thereby maintaining the aim of the illumination device toward the same general ground area at the side of the vehicle throughout the range of pivoting of the mirror head. The illumination device may be biased (such as via a spring-loaded connecting element or the like) to return the guide element 36 toward the opposite or initial end of the slot when the mirror head is pivoted in the opposite direction and the connecting element 22 unwinds from the element 36 at the mounting base.

Figure 5A:
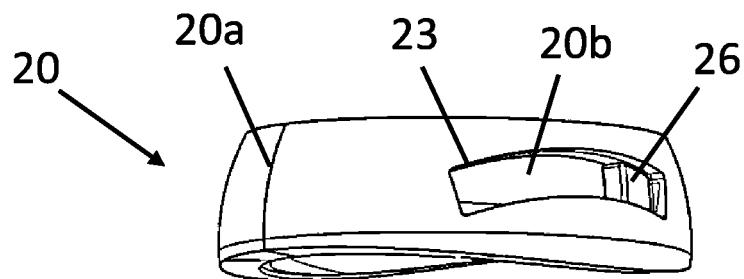
FIGS. 5A-D show positions of the inner part of the illumination device relative to the outer part or housing of the illumination device as the exterior mirror is adjusted between a use or non-folded state and a parking or folded state.
Figure 5B:
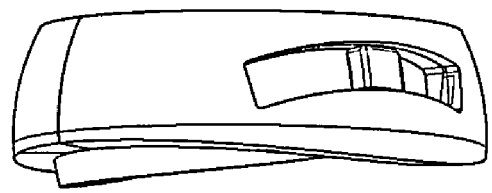
Figure 5C:
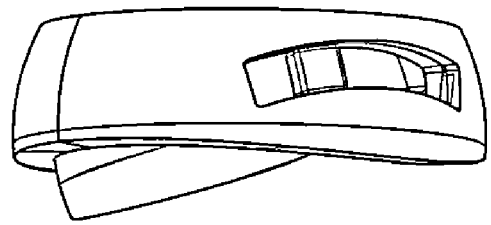
Figure 5D:
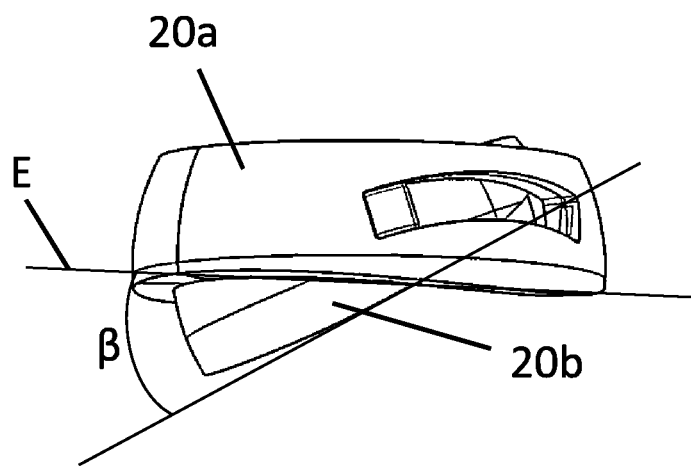

If the mirror head 12 is pivoted with respect to the mirror base 18, the connecting element 22 brings about a rotation movement of the inner part 20b with respect to the base part 20a and with respect to the mirror housing 16. The slots 23 of the base part 20a of the surroundings lamp 20 are configured in such a way that a guided movement of the inner part 20b takes place, wherein the inner part 20b pivots out of the plane of the base part 20a. This pivoting movement of the inner part 20b with respect to the base part 20a is shown in FIGS. 5A-D. Here, FIG. 5A shows the position of use and the lower illustration shows the parking position. While the inner part 20b is still held accommodated entirely within the base part 20a in the position of use and the guide elements 26 are located on the right-hand side in the slot 23 at the stop, as the guide element 26 moves further in the slot 23 (see FIGS. 5B-D) the inner part 20b pivots out of the plane E by an angle beta (FIG. 5D).

As a result of this pivoting movement of the inner part 20b with respect to the base part 20a, the movement of the mirror head 12 with the lower housing half shell 16a is compensated during the pivoting movement from the position of use into the parking position, with the result that the surroundings lamp 20 maintains the illumination of the same ground area 30 over the entire pivoting range of the mirror head 12 with respect to the side 11a of the vehicle 11.

Figure 6:
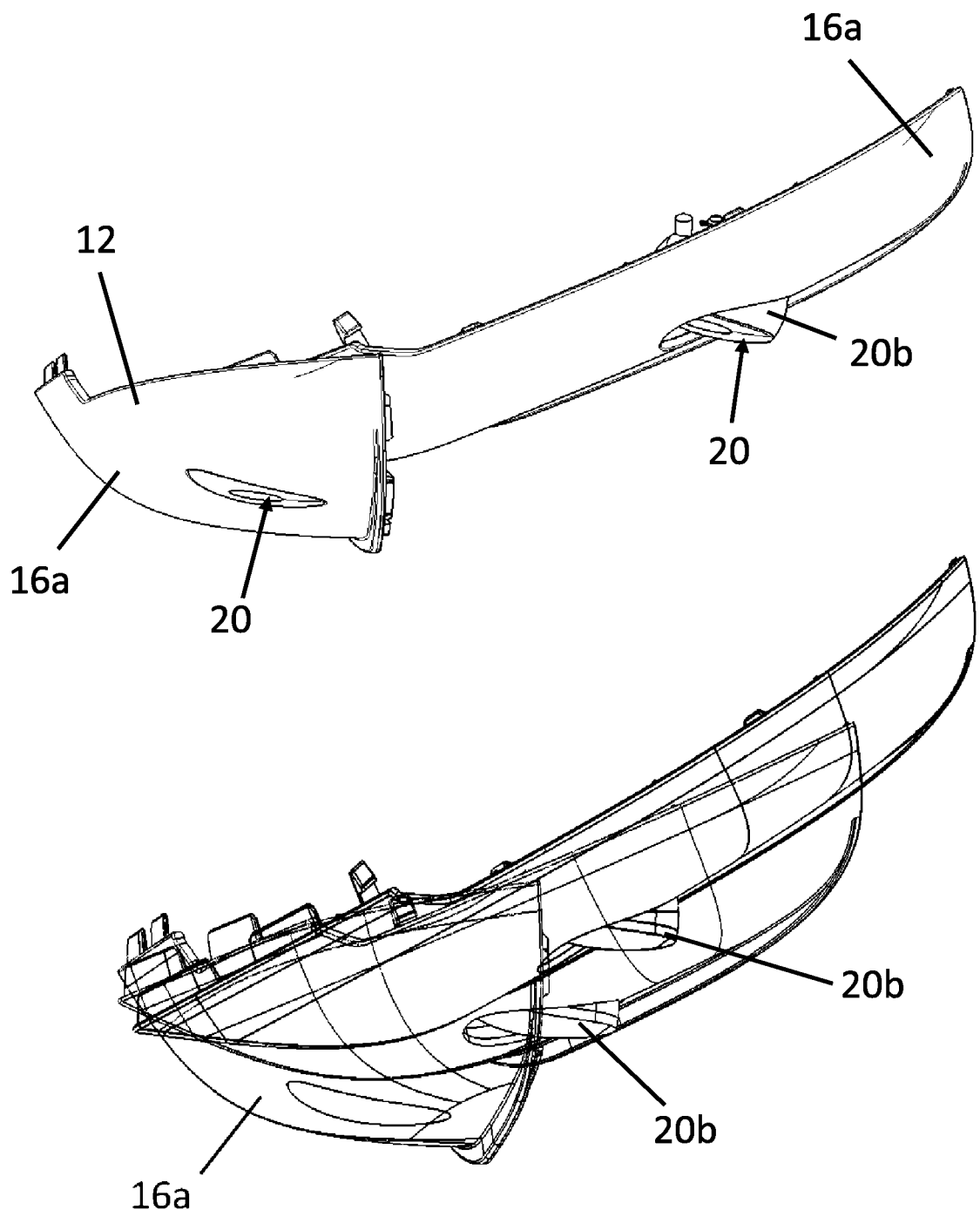
FIG. 6 is a perspective view of the lower part of the mirror housing and of the illumination device when the exterior rearview mirror assembly is in its state of use and when the exterior rearview mirror assembly is in the parking position.

The different end positions are illustrated on the upper side of FIG. 6. On the lower side of FIG. 6, the end positions and an intermediate position are shown.

In the position of use, the surroundings lamp 20 is held in the mirror housing 16 in such a way that the cover plate 34 terminates level with the external contour of the mirror housing 16. In the parking position, the inner part 20b of the surroundings lamp 20 projects out of the mirror housing 16 by an angle beta.

The embodiment of the exterior rearview mirror assembly which is described above and which permits a constant illumination range 30 of the surroundings lamp 20 during an adjustment of the exterior rearview mirror assembly between a position of use and a parking position, and vice versa, is implemented by means of a connecting element by means of a mechanical adjustment/coupling between the inner part 20b and an element which is arranged fixed to the vehicle. During the pivoting of the mirror head 12, the connecting element 22 applies a force to an articulation point on the inner part 20b of the surroundings lamp.

The articulation point can be here the pin 26 of the inner part 20b or another point on the upper edge 36 of the inner part. In order to implement corresponding resetting of the inner part 20b during the adjustment movement starting from the parking position into the position of use, a resetting element 38 is arranged between the inner part 20b and the base element 20*a*. The resetting element 38 adjusts the inner part 20*b* back into the home position in FIG. 5A by means of spring force when the mirror head 12 is pivoted again into the position of use. In this context, the connecting element is lengthened and the force acting on the articulation point is reduced.

In an alternative embodiment of the inventive concept, the pivoting movement of the inner part 20*b* with respect to the base part 20*a* can also be implemented by means of an electric motor. In this embodiment, a drive unit which transmits an adjustment movement to the inner part 20*b* by means of corresponding actuation of an electric motor and of a gear mechanism unit connected thereto is arranged in the mirror head 12.

Figure 7:
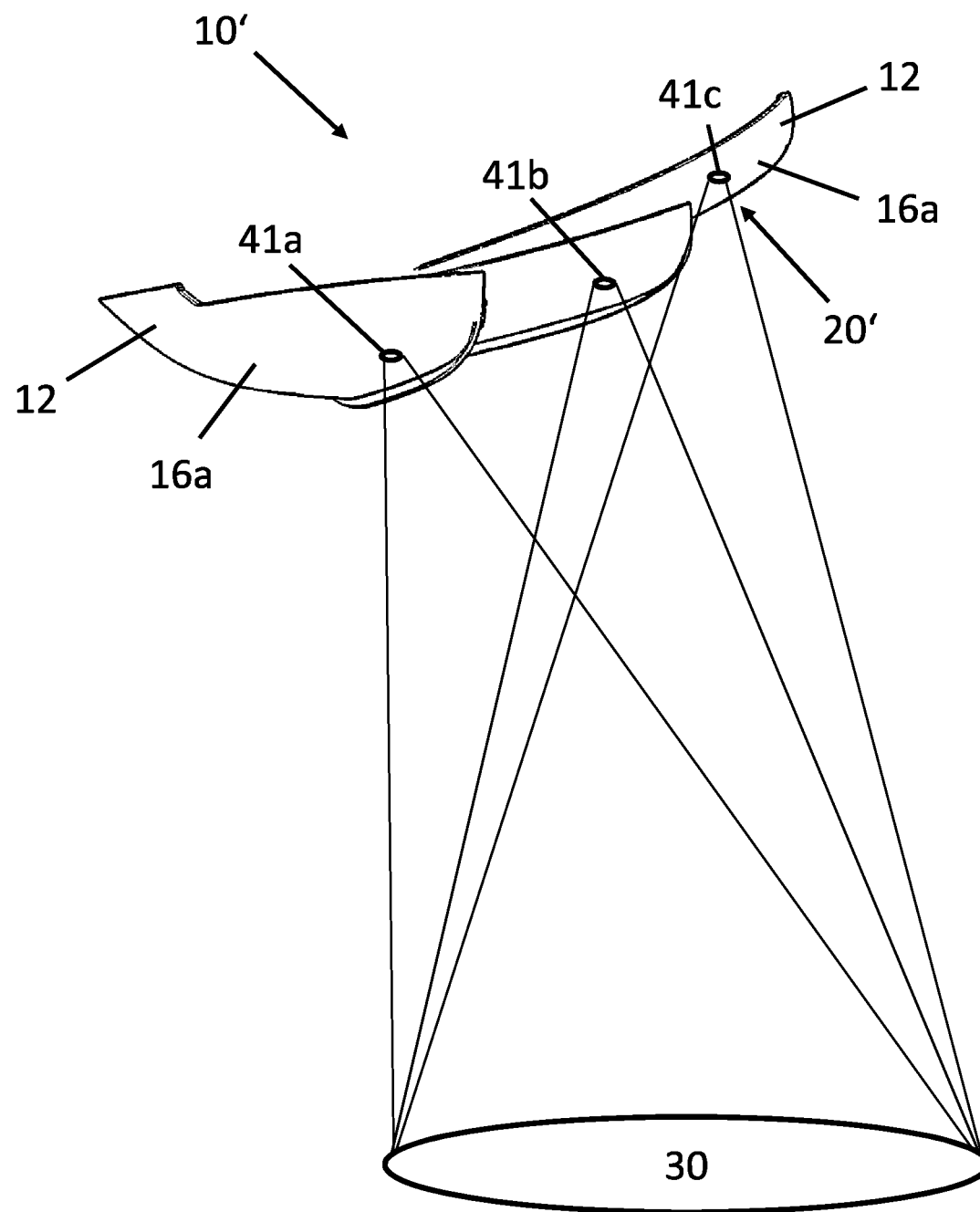
FIG. 7 is a perspective view of a lower part of a mirror housing in a further embodiment of the exterior rearview mirror assembly and of a surroundings lamp in three positions of the exterior rearview mirror assembly.

In one alternative in the embodiment of the exterior rearview mirror assembly 10' which is illustrated in FIG. 7, the device of the surroundings lamp 20' is configured in such a way that lighting elements 41*a*, 41*b*, 41*c*, preferably LEDs, are arranged at different positions on the underside of the mirror head 12 and/or of the housing half shell 16*a*. The arrangement and orientation of the lighting elements 41*a-c* are such here that each lighting element illuminates in each case the same constant ground area 30 when the lighting element is activated and emits light at an assigned pivoting angle. This is shown in three positions with reference to three LEDs. The lighting elements 41*a-c* are actuated and activated here by means of corresponding control as a function of the pivoting angle/pivoting range. As an example, the first lighting element 41*a* is activated in an angle range of 0 to 13.75 degrees (pivoting angle starting from the position of use=0 degrees and the parking position=55 degrees), the second lighting element 41*b* is activated in an angle range of 13.75 to 41.25 degrees, and the third lighting element 41*c* is activated in an angle range of 41.25 to 55 degrees.

In yet a further embodiment, the device of the surroundings lamp can be embodied in such a way that a plurality of lighting elements, preferably LEDs, are arranged at a location in the region of the underside of the mirror head 12 or of the mirror housing 16, wherein a collimator element is arranged in the radiation range of all the lighting elements. Each lighting element is assigned here to a pivoting angle or an angle range such as with respect to the example given above, and is activated in the assigned angle range so that approximately the same constant ground area is illuminated over the entire pivoting range. The lighting elements may be disposed behind and emitting light through a single or common cover, or each lighting element may have its own respective cover at the lower surface of the mirror head. For applications where a logo or symbol or icon is projected onto the ground at the side of the vehicle, the logo or symbol or icon may be established at the common cover or the cover of each individual lighting element may have the logo or symbol or icon established thereat. In order to maintain the orientation of the projected logo or symbol or icon at the ground, the common cover may rotate relative to the mirror head or the logo or symbol or icon established at the respective covers may be oriented differently for the respective lighting elements to generally maintain the orientation of the projected logo or symbol or icon at the ground.

The mirror assembly thus comprises a powerfold mirror assembly that includes an actuator that is operable to pivot the mirror head 12 (comprising the mirror casing 16 and reflective element 14 and illumination device 20) relative to the mounting arm or base 18 between a user or drive or non-folded position (FIG. 6) and a folded or park position (FIG. 7). The mirror head is also pivotable manually to either the use or folded position. Optionally, the mirror head may also be pivoted to a fully forward position. The pivot axis of the mirror head relative to the mounting portion or base may comprise a generally vertical pivot axis or may be inclined, whereby the mirror head may swing upward (or downward) as it moves from the non-folded state to the folded state.

The base or outer portion of the lighting device is mounted at a lower portion of the mirror casing, such as at an aperture formed through the lower portion of the mirror casing. The outer portion includes a slot or guide at opposite sides thereof. The inner portion (which includes the illumination source or light emitting diode (LED), a cover or lid, and a printed circuit board (PCB) with associated circuitry and/or electrical wiring or leads) is adjustably mounted at or disposed at the outer portion and includes a pair of pins or guides that are received in the respective slots of the outer portion, such that the inner portion and LED pivot or move relative to the outer portion and the mirror casing.

The inner portion is connected to a fixed element at the mirror mounting base or foot via a connecting element, such as a wire or cable or the like. As the mirror head pivots relative to the mounting base, the connecting element causes pivotal movement of the inner portion relative to the outer portion and relative to the mirror casing. The slots of the outer portion of the illumination device are formed to provide a controlled guided pivotal movement or swinging of the inner portion so that the illumination device maintains illumination of generally the same ground area at the side of the vehicle throughout the range of pivoting of the mirror head relative to the side of the vehicle.

The constant field lighting system of the present invention is provided via a mechanical principle, such as a cable that is connected at the light source housing (the inner portion or LED housing) and that is connected at its other end to part of the mirror mounting base or foot. Movement of the inner portion is controlled and defined via the slots of the outer part of the illumination device so that the inner part will remain in the same position (relative to the side of the vehicle) as the mirror head pivots between the non-folded position and the folded position. During movement of the mirror head from the folded position to the non-folded position, an elastic material may pull the inner part of the lamp or illumination device back to its initial position. The constant field lighting system is applicable to exterior mirrors with vertical folding axes as well as to exterior mirrors with inclined folding axes. With the system of the present invention, the lighting device illuminates the area in front of the vehicle door when the mirror head is in the use position and the parking position and during the process of folding the mirror head between the use position and the parking position.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly for a vehicle, said exterior rearview mirror assembly comprising:

a mirror head pivotally mounted at a mounting base configured for attachment at a side of a vehicle, wherein the mirror head comprises a mirror casing and a reflective element adjustably disposed at the mirror casing;

an illumination device disposed at the mirror head, wherein the illumination device comprises a light source that, with the mounting base attached at the side of the vehicle and when the light source is operated, emits visible light to illuminate a ground region at the side of the vehicle at which the exterior rearview mirror assembly is attached;

a powerfold actuator that is electrically operated to pivot the mirror head relative to the mounting base between at least a folded position and a drive position;

wherein, with the mounting base attached at the side of the vehicle, when the powerfold actuator pivots the mirror head between the folded position and the drive position, and with the light source of the illumination device operated to emit visible light, the visible light emitted by the light source of the illumination device is directed toward the same ground area at the side of the vehicle throughout the range of pivotal movement of the mirror head; and wherein the illumination device comprises a base portion fixedly disposed at the mirror head, and wherein the illumination device comprises a movable portion movably disposed at the base portion, and wherein the movable portion comprises the light source, and wherein, with the mounting base attached at the side of the vehicle, the movable portion is moved relative to the base portion as the mirror head pivots between the folded position and the drive position so that light emitted by the light source of the illumination device is directed toward the same ground area at the side of the vehicle throughout the range of pivotal movement of the mirror head.

2. The exterior rearview mirror assembly of claim 1, comprising a connecting element that mechanically connects the movable portion of the illumination device with the mounting base, wherein, with the mounting base attached at the side of the vehicle, and when the powerfold actuator pivots the mirror head between the folded position and the drive position, the connecting element moves the movable portion relative to the base portion so that light emitted by the light source of the illumination device is directed toward the same ground area at the side of the vehicle throughout the range of pivotal movement of the mirror head.

3. The exterior rearview mirror assembly of claim 2, wherein a resetting element is provided that mechanically connects the movable portion of the illumination device to the base portion of the illumination device, and wherein, with the mounting base attached at the side of the vehicle, the resetting element moves the movable portion relative to the base portion in such a way that, during pivoting movement of the mirror head in a direction opposite of the direction that caused the connecting element to move the movable portion relative to the base portion, the light source is directed toward the same ground area at the side of the vehicle as the mirror head is pivoted in the opposite direction.

4. The exterior rearview mirror assembly of claim 3, wherein the connecting element comprises a cable that pulls at part of the movable portion as the mirror head pivots from the drive position toward the folded position.

5. The exterior rearview mirror assembly of claim 1, wherein the base portion comprises at least one guide slot, and wherein the movable portion comprises at least one guide element that slidably moves along the guide slot as the mirror head pivots between drive position and the folded position.

6. The exterior rearview mirror assembly of claim 5, wherein the at least one guide slot comprises an arcuate profile at opposite sides of the base portion.

7. The exterior rearview mirror assembly of claim 1, wherein a resetting element is provided which biases the movable portion with respect to the base portion to urge the movable portion toward a home position, and wherein the home position is the position of the movable portion relative to the base portion when the mirror head is in the drive position.

8. The exterior rearview mirror assembly of claim 1, wherein a resetting element is provided which biases the movable portion with respect to the base portion to urge the movable portion toward a home position, and wherein the home position is the position of the movable portion relative to the base portion when the mirror head is in the folded position.

9. The exterior rearview mirror assembly of claim 1, wherein an electrically operated drive unit is coupled to the movable portion in such a way that, with the mounting base attached at the side of the vehicle, and when the electrically operated drive unit is actuated while the mirror head pivots relative to the mounting base, the movable portion moves relative to the base portion such that visible light emitted by the illumination device is directed toward the same ground area at the side of the vehicle throughout the range of pivotal movement of the mirror head.

10. An exterior rearview mirror assembly for a vehicle, said exterior rearview mirror assembly comprising:

a mirror head pivotally mounted at a mounting base configured for attachment at a side of a vehicle, wherein the mirror head comprises a mirror casing and a reflective element adjustably disposed at the mirror casing;

an illumination device disposed at the mirror head, wherein the illumination device comprises a light source that, with the mounting base attached at the side of the vehicle and when the light source is operated, emits visible light to illuminate a ground region at the side of the vehicle at which the exterior rearview mirror assembly is attached;

a powerfold actuator that is electrically operated to pivot the mirror head relative to the mounting base between at least a folded position and a drive position;

wherein, with the mounting base attached at the side of the vehicle, when the powerfold actuator pivots the mirror head between the folded position and the drive position, and with the light source of the illumination device operated to emit visible light, the visible light emitted by the light source of the illumination device is directed toward the same ground area at the side of the vehicle throughout the range of pivotal movement of the mirror head; and wherein the illumination device comprises a plurality of light emitting diodes (LEDs), with individual LEDs of the plurality of LEDs disposed at respective positions at a lower portion of the mirror head, and wherein each LED is assigned to a respective pivoting range, and wherein the LEDs are individually activated in such a way that, with the mounting base attached at the side of the vehicle, and as the mirror head is pivoted relative to the mounting base, and when the mirror head is at a pivoting angle within one of the pivoting ranges, the respective LED for that pivoting range is activated to illuminate the ground area, which corresponds to the same ground area illuminated by the other LEDs when the mirror head is at a pivoting angle at or in the respective other pivoting ranges.

11. An exterior rearview mirror assembly for a vehicle, said exterior rearview mirror assembly comprising:

a mirror head pivotally mounted at a mounting base configured for attachment at a side of a vehicle, wherein the mirror head comprises a mirror casing and a reflective element adjustably disposed at the mirror casing;

an illumination device disposed at the mirror head, wherein the illumination device comprises a light source that, with the mounting base attached at the side of the vehicle and when the light source is operated, emits visible light to illuminate a ground region at the side of the vehicle at which the exterior rearview mirror assembly is attached;

a powerfold actuator that is electrically operated to pivot the mirror head relative to the mounting base between at least a folded position and a drive position;

wherein, with the mounting base attached at the side of the vehicle, when the powerfold actuator pivots the mirror head between the folded position and the drive position, and with the light source of the illumination device operated to emit visible light, the visible light emitted by the light source of the illumination device is directed toward the same ground area at the side of the vehicle throughout the range of pivotal movement of the mirror head; and wherein the illumination device comprises a plurality of light emitting diodes (LEDs), and wherein the LEDs are arranged at a lower portion of the mirror head, and wherein a collimator element is arranged in a path of emitted light for the LEDs, and wherein each LED is assigned to a respective pivoting range, and wherein, with the mounting base attached at the side of the vehicle, and during pivotal movement of the mirror head, the LEDs are activated in accordance with a pivoting angle of the mirror head being within their assigned pivoting range to illuminate the ground area, which corresponds to the same ground area illuminated by the other LEDs when the mirror head is at a pivoting angle at or in the respective other pivoting ranges.

12. An exterior rearview mirror assembly for a vehicle, said exterior rearview mirror assembly comprising:

a mirror head pivotally mounted at a mounting base configured for attachment at a side of a vehicle, wherein the mirror head comprises a mirror casing and a reflective element adjustably disposed at the mirror casing;

an illumination device disposed at the mirror head, wherein the illumination device comprises a light source that, with the mounting base attached at the side of the vehicle and when the light source is operated, emits visible light to illuminate a ground region at the side of the vehicle at which the exterior rearview mirror assembly is attached;

wherein the illumination device comprises a base portion fixedly disposed at the mirror head, and wherein the illumination device comprises a movable portion movably disposed at the base portion, and wherein the movable portion comprises the light source;

a connecting element that mechanically connects the movable portion of the illumination device with the mounting base;

a powerfold actuator that is electrically operated to pivot the mirror head relative to the mounting base between at least a folded position and a drive position;

wherein, with the mounting base attached at the side of the vehicle, and when the powerfold actuator pivots the mirror head between the folded position and the drive position, and with the light source of the illumination device operated to emit visible light, the connecting element moves the movable portion relative to the base portion as the mirror head pivots between the folded position and the drive position so that the visible light emitted by the light source of the illumination device is directed toward the same ground area at the side of the vehicle throughout the range of pivotal movement of the mirror head; and wherein the connecting element moves the movable portion in a first direction relative to the base portion as the mirror head pivots in a first pivot direction, and wherein the movable portion is biased relative to the base portion in toward a home position and in a second direction opposite to the first direction such that, when the mirror head pivots in a second pivot direction opposite the first pivot direction, the movable portion is urged in the second direction toward the home position.

13. The exterior rearview mirror assembly of claim 12, wherein the connecting element comprises a cable that pulls at part of the movable portion as the mirror head pivots from the drive position toward the folded position.

14. The exterior rearview mirror assembly of claim 12, wherein the base portion comprises at least one guide slot, and wherein the movable portion comprises at least one guide element that slidably moves along the guide slot as the mirror head pivots between drive position and the folded position.

15. The exterior rearview mirror assembly of claim 14, wherein the at least one guide slot comprises an arcuate profile at opposite sides of the base portion.

16. The exterior rearview mirror assembly of claim 12, wherein the home position is the position of the movable portion relative to the base portion when the mirror head is in the drive position.

17. The exterior rearview mirror assembly of claim 12, wherein the home position is the position of the movable portion relative to the base portion when the mirror head is in the folded position.

18. An exterior rearview mirror assembly for a vehicle, said exterior rearview mirror assembly comprising:

a mirror head pivotally mounted at a mounting base configured for attachment at a side of a vehicle, wherein the mirror head comprises a mirror casing and a reflective element adjustably disposed at the mirror casing;

an illumination device disposed at the mirror head, wherein the illumination device comprises a light source that, with the mounting base attached at the side of the vehicle and when the light source is operated, emits visible light to illuminate a ground region at the side of the vehicle at which the exterior rearview mirror assembly is attached;

wherein the illumination device comprises a base portion fixedly disposed at the mirror head, and wherein the illumination device comprises a movable portion movably disposed at the base portion, and wherein the movable portion comprises the light source;

an electrically operated drive unit coupled to the movable portion and operable to move the movable portion relative to the base portion;

a powerfold actuator that is electrically operated to pivot the mirror head relative to the mounting base between at least a folded position and a drive position;

wherein the electrically operated drive unit operates responsive to operation of the powerfold actuator; and wherein, with the mounting base attached at the side of the vehicle, and while the powerfold actuator pivots the mirror head relative to the mounting base, and with the light source of the illumination device operated to emit visible light, the electrically operated drive unit operates to move the movable portion relative to the base portion such that visible light emitted by the illumination device is directed toward the same ground area at the side of the vehicle throughout the range of pivotal movement of the mirror head.

19. The exterior rearview mirror assembly of claim 18, wherein the base portion comprises at least one guide slot, and wherein the movable portion comprises a guide element that slidably moves along the guide slot as the mirror head pivots between drive position and the folded position, and wherein the electrically operated drive unit operates to move the guide element along the guide slot.

* * * * *